(12) United States Patent
Tormasov et al.

(10) Patent No.: US 11,075,744 B2
(45) Date of Patent: Jul. 27, 2021

(54) BLOCKCHAIN-BASED MEDIA CONTENT AUTHENTICATION METHODS AND SYSTEMS

(71) Applicant: Acronis International GmbH, Schaffhausen (CH)

(72) Inventors: Alexander Tormasov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 262 days.

(21) Appl. No.: 16/194,731

(22) Filed: Nov. 19, 2018

(65) Prior Publication Data

US 2019/0158274 A1    May 23, 2019

Related U.S. Application Data

(60) Provisional application No. 62/588,471, filed on Nov. 20, 2017.

(51) Int. Cl.
| | |
|---|---|
| *H04L 9/06* | (2006.01) |
| *H04L 29/06* | (2006.01) |
| *G06N 20/00* | (2019.01) |
| *H04L 9/32* | (2006.01) |

(52) U.S. Cl.
CPC ............ *H04L 9/0637* (2013.01); *G06N 20/00* (2019.01); *H04L 9/3239* (2013.01); *H04L 9/3247* (2013.01); *H04L 9/3297* (2013.01); *H04L 65/602* (2013.01); *H04L 65/605* (2013.01); *H04L 65/607* (2013.01); *H04L 2209/38* (2013.01)

(58) Field of Classification Search
CPC ... H04L 9/0637; H04L 9/3239; H04L 65/605; H04L 9/3297; H04L 9/3247; H04L 65/602; H04L 65/607; H04L 2209/38; G06N 20/00
See application file for complete search history.

(56) References Cited

U.S. PATENT DOCUMENTS

| 10,176,309 B2 * | 1/2019 | Tormasov | G06F 21/16 |
| 10,305,694 B2 * | 5/2019 | Dix | H04L 9/3239 |
| 10,747,721 B2 * | 8/2020 | Jang | G06F 16/1865 |
| 10,880,105 B1 * | 12/2020 | Li | H04L 9/3297 |

(Continued)

*Primary Examiner* — Christopher A Revak
(74) *Attorney, Agent, or Firm* — Arent Fox LLP; Michael Fainberg

(57) ABSTRACT

Disclosed herein are systems and method for storing media authentication data using a distributed ledger. In one aspect, an exemplary method comprises, receiving, by a processor of a computing node of a plurality of computing nodes, one or more hashes associated with a media content and a timestamp, the computing nodes being communicatively linked, generating a data block that contains at least one of the received hashes, the data block being generated by hashing a hash corresponding to a previous data block of the distributed ledger together with the at least one hash, the at least one hash corresponding to the media content of the data block being generated, transmitting to the plurality of computing nodes, a message reporting an addition of the generated data block, wherein at least some of the plurality of computing nodes maintain at least a partial copy of the distributed ledger.

20 Claims, 6 Drawing Sheets

(56) References Cited

U.S. PATENT DOCUMENTS

| | | | |
|---|---|---|---|
| 2016/0292680 A1* | 10/2016 | Wilson, Jr. | G06Q 20/40 |
| 2018/0287790 A1* | 10/2018 | Everett | H04L 9/3239 |
| 2019/0066079 A1* | 2/2019 | Liu | G06K 19/06037 |
| 2019/0305937 A1* | 10/2019 | Baykaner | H04L 9/3236 |
| 2020/0076576 A1* | 3/2020 | Ahlback | H04L 9/0637 |
| 2020/0295941 A1* | 9/2020 | Daniel | H04L 63/123 |
| 2021/0075623 A1* | 3/2021 | Petersen | H04L 9/0618 |

* cited by examiner

# BLOCKCHAIN-BASED MEDIA CONTENT AUTHENTICATION METHODS AND SYSTEMS

CROSS REFERENCE TO RELATED APPLICATIONS

The present application claims benefit of priority to U.S. Provisional Application No. 62/588,471, filed on Nov. 20, 2017, the contents of which is incorporated herein by reference.

FIELD OF TECHNOLOGY

The present disclosure generally relates to the field of media content authentication, and more specifically, to a digital distribution ledger based methods and systems for authenticating media content, e.g., video recordings, video streams, audio recordings, audio streams, or a data stream from at least one device that analyzes and generates a real time data stream. In one aspect, the at least one device that generates the real time data stream comprises one or more: radars, lidars or spectrals, and the like.

BACKGROUND

In recent years, media streams and recordings have become increasingly popular among internet users, particularly in view of the widespread adoption and availability of broadband internet access. Users receive a significant amount of news and entertainment content as video or audio from public and private sources. Such content may include streams or recordings of public addresses from elected or appointed government officials. In some instances, users may also encounter media streams of public figures which have been purportedly recorded in secret, e.g., as part of investigation, and later leaked to a news outlet. In the past, recordings would typically be presumed to be true without the need for substantial analysis because of the high costs and effort required to stage or manipulate the media content. However, over the past decade media content manipulation tools have become increasingly more sophisticated and are now widely accessible to users. In fact, recent tools have been demonstrated which can analyze previous recordings of a subject and output high quality computer-generated media stream of the subject which may appear authentic to the average viewer. These tools are quite useful in certain contexts (e.g., for generating video footage suitable for movies). However, these tools also present a concern in that they may allow unethical private or state actors to generate false media streams (e.g., of video or audios of government officials), for blackmail or to discredit the subject.

Current methods are available for authenticating media content. However, such methods are typically time-consuming and laborious with respect to the need for expert analysis and processing, limiting their usefulness. An authenticity analysis using these techniques may require, for example analyzing a recording frame-by-frame for anomalies detected either visually by an expert or by algorithmic analysis. In some cases, different experts may reach different conclusions due to the subject nature of this type of investigation. Moreover, in view of the short news cycle and ease at which such media content can be widely disseminated to the public, by the time authentication is completed using current methods, a media content may already have been viewed by millions of users. As a result, a substantial portion of the public may incorrectly believe that a false or modified media content is accurate, despite a subsequent expert analysis concluding otherwise. Put simply, by the time the truth of the matter is known, the damage is likely already done and the damage is generally irreversible—absent a substantial effort to inform the public about the false nature of the media content in question.

Given these concerns and the lack of suitable alternatives, there exists a need for a secure and efficient method of authenticating media content, e.g., video recordings, video streams, audio recordings, audio streams, data streams from radars/lidars/spectrals, etc.

SUMMARY

Disclosed are methods, systems and computer program products for authenticating media recordings and media streams using a digitally distributed ledger, e.g., a blockchain-based distribution ledger, a hash-graph, and any other hashes known in the art. Aspects of the disclosure address the shortcomings described above in the art of media content authentication. Further advantages over the current art will be readily apparent in view of the description provided herein.

In one exemplary aspect, a method for storing media content authentication data using a digital distribution ledger, e.g., a blockchain-based distributed ledger, is implemented in a computing node of a plurality of computing nodes comprising a processor, the method, comprising: receiving, by the processor, one or more hashes associated with a media content and a timestamp associated with the media content; generating, by the processor, a data block that contains at least one of the received one or more hashes, the data block being generated by hashing a hash corresponding to a previous data block of the distributed ledger together with the at least one hash, the at least one hash corresponding to the media content of the data block being generated; and transmitting, by the computing node to the plurality of computing nodes, a message reporting an addition of the generated data block to the distributed ledger, wherein at least some of the plurality of computing nodes maintain at least a partial copy of the distributed ledger.

In one aspect, the media content comprises a video recording, a video stream, an audio recording, an audio stream, or a data stream from at least one device that analyzes and generates a real time data stream. In one aspect, the media may be obtained from any combination of different sources of media content. In one aspect, the device that generates the real time data stream may include one or more: radars, lidars, spectrals, and the like.

In one aspect, the hashing further including hashing the hash corresponding to the previous data block of the distributed ledger together with the timestamp associated with the media content of the data block being generated.

In one aspect, a hash of the received one or more hashes associated with the media content is based upon at least one of: a) one or more frames of the media content; b) audio contained in the media content; and c) metadata associated with the media content.

In one aspect, all the media content is covered with the hash.

In one aspect, a hash of the received one or more hashes associated with the media content is calculated based upon at least one of: a) a segment of the media content; b) a plurality of segments of the media content; c) a plurality of segments of the media content, wherein the plurality of segments span approximately a full length of the media content; d) a plurality of segments of the media content, wherein durations of each of the plurality of segments are approximately a same length; and e) a plurality of segments of the media content, wherein gaps between segments of the plurality of segments are approximately a same length.

In one aspect, a hash of the received one or more hashes associated with the media content is generated by one of: a) a computer; b) a mobile phone; c) a video camera; and d) an electronic device.

In one aspect, a hash of the received one or more hashes associated with the media content is associated with features identified by analyzing the media content using one or more machine learning algorithms, and wherein the computing node that transmitted to the other computing nodes regarding the addition of the generated data block to the distributed ledger is not associated with the generated data block.

In one aspect, the result of the analysis of the media content provides at least one of: a description of the media content, a media output discernable by humans, or a service information used for performing the analysis.

In one aspect, the method further comprises: authenticating a second media content using the distributed ledger, the authenticating including: receiving, by the processor, the second media content to be authenticated and a timestamp associated with the second media content; calculating, by a processor, at least one hash associated with the received second media content; comparing the at least one calculated hash to one or more hashes stored in the distributed ledger, the distributed ledger comprising a plurality of linked data blocks containing hashes associated with media content; and determining that the received second media content is authentic when a calculated hash of the at least one calculated hash is identical to at least one hash stored in the distributed ledger.

In one aspect, at least one hash of the received one or more hashes is generated by: receiving a media content to be analyzed and the timestamp associated with the media content; separating the received media content into one or more data streams or files containing at least one of: one or more frames, one or more segments, audio data, and metadata associated with the media content; and generating the at least one hash associated with the media content based upon the data streams or files.

In one aspect, the generating of the at least one hash further comprises: transmitting the at least one hash to a computing node that is communicatively linked to a distributed ledger.

In another aspect, the disclosure provides a computer-implemented method for authenticating media content using a digital distribution ledger, e.g., a blockchain-based distributed ledger, a hash-graph, etc., comprising: receiving a media content to be authenticated and a timestamp associated with the media content; calculating, by a processor, at least one hash associated with the media content; comparing the at least one calculated hash to one or more hashes stored in the distributed ledger, which comprises a plurality of linked data blocks containing hashes associated with media contents; and determining that the received media content is authentic when the at least one calculated hash is identical to at least one hash stored in the distributed ledger.

In another aspect, the disclosure provides a computer-implemented method for generating a media content authentication hash, comprising: receiving a media content to be analyzed and a timestamp associated with the media content; separating the media content into one or more data streams or files containing at least one of: one or more media frames, one or more media segments, audio data, and metadata associated with the media content; and generating at least one hash associated with the media content based upon the data streams or files. That is, the at least one hash is generated based upon the separated media content into the one or more media frames, the one or more media segments, the audio data, and the metadata associated with the media content.

In another aspect, the disclosure provides a system having at least one processor configured to perform the steps of any of the methods disclosed herein.

In one exemplary aspect, a non-transitory computer readable medium is provided storing a set of computer-executable instructions thereon for authenticating a media content, including instructions for carrying out any of the methods disclosed herein.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
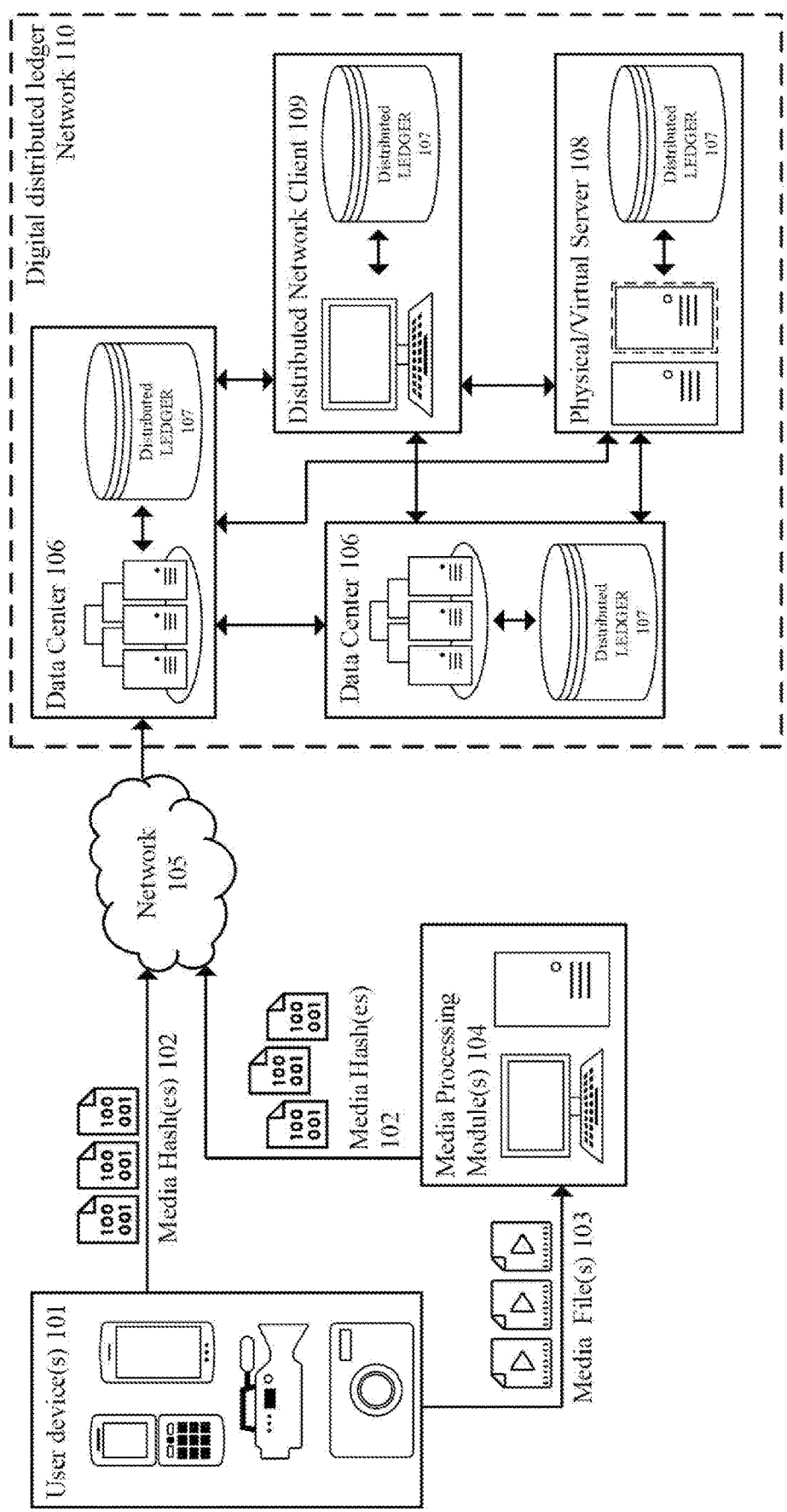
FIG. 1 is a block diagram illustrating a digital distribution ledger-based system for authenticating media content according to an exemplary aspect.

Exemplary aspects of the present invention are described herein in the context of a method, system, and computer program product for authenticating media content, e.g., video recordings, video streams, audio recordings, audio streams, or real-time data streams generated by radars/lidars/spectrals, using a digital distribution ledger, e.g., a blockchain-based distributed ledger, a hash-graph based distribution ledger, etc. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Aspects of the present disclosure enable one to verify the authenticity of a media content by comparing a digital signature associated with the media content (a media recording or media stream or a portion thereof such as a segment, frame(s), metadata, video and/or audio) with an archived digital signature stored in a digital distribution ledger, e.g., a blockchain-based distributed ledger. Blockchain-based distributed ledgers are particularly well-suited for storing authenticity data. Blockchain technology stores data as a chronologically linked chain of events, effectively creating a distributed database. Cryptographic digital signatures (e.g., hashes) may be implemented as part of the blockchain in order to ensure the integrity of linked data blocks in a given blockchain. For example, a user device (e.g., a mobile phone, video camera, computer or other electronic device) capable of recording, receiving otherwise generating a media stream, can generate one or more cryptographic hashes of media recording or media stream data content, and subsequently transmit these hash(es) to a data center for storage as part of a blockchain. The content may include any visual, audio and/or metadata associated with the respective recording or steam, or a portion thereof (e.g., data associated with a subset of frames or a segment of the respective media recording or stream).

In one exemplary aspect, a selected media content from a given media recording or media stream may be processed using one or more feature recognition algorithms (e.g., machine learning algorithms) to identify features that may be used to generate the hash(es) associated with the selected media content. Individual data blocks may also include a timestamp or other content useful for authenticating media (e.g., location data, or a cryptographic key and/or other information associated with a given user, company, group or other entity).

In one exemplary aspect, the media recording or media stream may be separated into individual files or data streams containing video, audio, and/or metadata content contained in the original media recording or media stream (e.g., using a demultiplexer). Some or all of the demultiplexed (demuxed) data may be used to generate the hash(es) associated with the media recording or media stream. In one aspect, the some or all of the demuxed data may be subject to optional feature recognition. As described above, hashes may also be generated based upon only a portion of the original media recording or media stream. In some aspects, a hash may be generated based upon an individual frame or a subset of frames of the media recording or media stream. In one aspect, multiple hashes may be generated for a given media recording or media stream by generating a hash at repeating time intervals (e.g., every 1, 10, 30 or 60 minutes). In some instances, an even shorter interval (e.g., 0.5, 1, or 30 seconds) may be desirable. A timestamp or other useful information (e.g., location data) may also be included as part of the hash(es).

In one exemplary aspect, the hash generation process may take place on a user device. However, it is understood that the media recording or media stream may also be transmitted, copied, or otherwise provided to a second device capable of performing the hashing process (e.g., a second device having a hash processing module). In either case, the resulting hash(es) may then be sent via a network, to a local or remote data center, a server, or another client capable of storing the hashes in a distributed ledger.

It is contemplated that in some aspects a user device and/or the media processing module may alternatively be configured to generate hashes and to communicate with one or more computing nodes which form a digital distribution ledger, e.g., a blockchain-based distributed ledger. For example, a user device (e.g., a smartphone) may include a software client capable of: generating data blocks that can be stored in a blockchain, and communicating with other computing nodes that form the blockchain-based distributed ledger (e.g., to report the addition of a new data block to the blockchain or to respond to requests from other computing nodes).

In one exemplary aspect, the digital distribution ledger may be a private digital distribution ledger where only specific computing nodes are allowed to participate in the network, execute the consensus protocol and maintain the shared ledger. In one aspect, computing nodes that are allowed to participate in the network may be preapproved. In other words, there may be an approval process for joining the network of participants in the private digital distribution ledger, e.g., a private blockchain. In one exemplary aspect, approved computing nodes may comprise computing nodes operated or controlled by a maintainer of the distributed ledger at one or more secure data centers. It is noted that the distributed nature of the blockchain makes it difficult, if not impossible, for a rogue actor to manipulate the blockchain (e.g., an attacker would typically have to compromise a majority of the connected computing nodes).

FIG. 1 is a block diagram illustrating a digital distribution ledger-based system for authenticating a media content, according to an exemplary aspect. In one aspect, the media content includes one or more video recordings, video streams, audio recordings, audio streams, or data streams from radars/lidars/spectrals. As shown in FIG. 1, a user device 101 may comprise for example a mobile phone, smartphone, video camera, audio recorder, or digital camera capable of storing, recording or otherwise generating a media file 103 including a media recording or media stream. In some aspects, the user device 101 may be a computer or other electronic device which shares this functionality. In either case, the user device 101 may be configured to generate one or more cryptographic signatures (e.g., hashes) based on the content of a media recording or media stream (e.g., the visual, audio or metadata content of some or all of the media recording or media stream). In one aspect, the hash generation process may be performed by a separate media processing module 104 after the creation of the original recording or stream, such as by a computer or server to which the original recording or stream has been provided. Once a hash 102 is generated, it may then be sent via a network 105 to a local or remote data center 106, server, or other client capable of generating data blocks that may be appended to a distribution ledger 110, e.g., a blockchain-based digital distributed ledger. As illustrated by FIG. 1, in this example the hash is received by a data center 106 which is communicatively linked to a distributed ledger 107 maintained by a network comprising a second data center 106, a physical or virtual server 108, and a client 109. Some or all of these other entities may be operated or controlled by the maintainer of the distributed ledger. In other aspects, one or more connected entities (e.g., clients) may be controlled or operated by the public. For example, as noted above the user device may also include a software client capable of communicating with the distributed ledger. It is further understood that the entities forming the distributed ledger may comprise any combination of clients, servers, or data centers capable of storing a partial or complete copy of the distributed ledger (e.g., multiple secure data centers).

Figure 2:
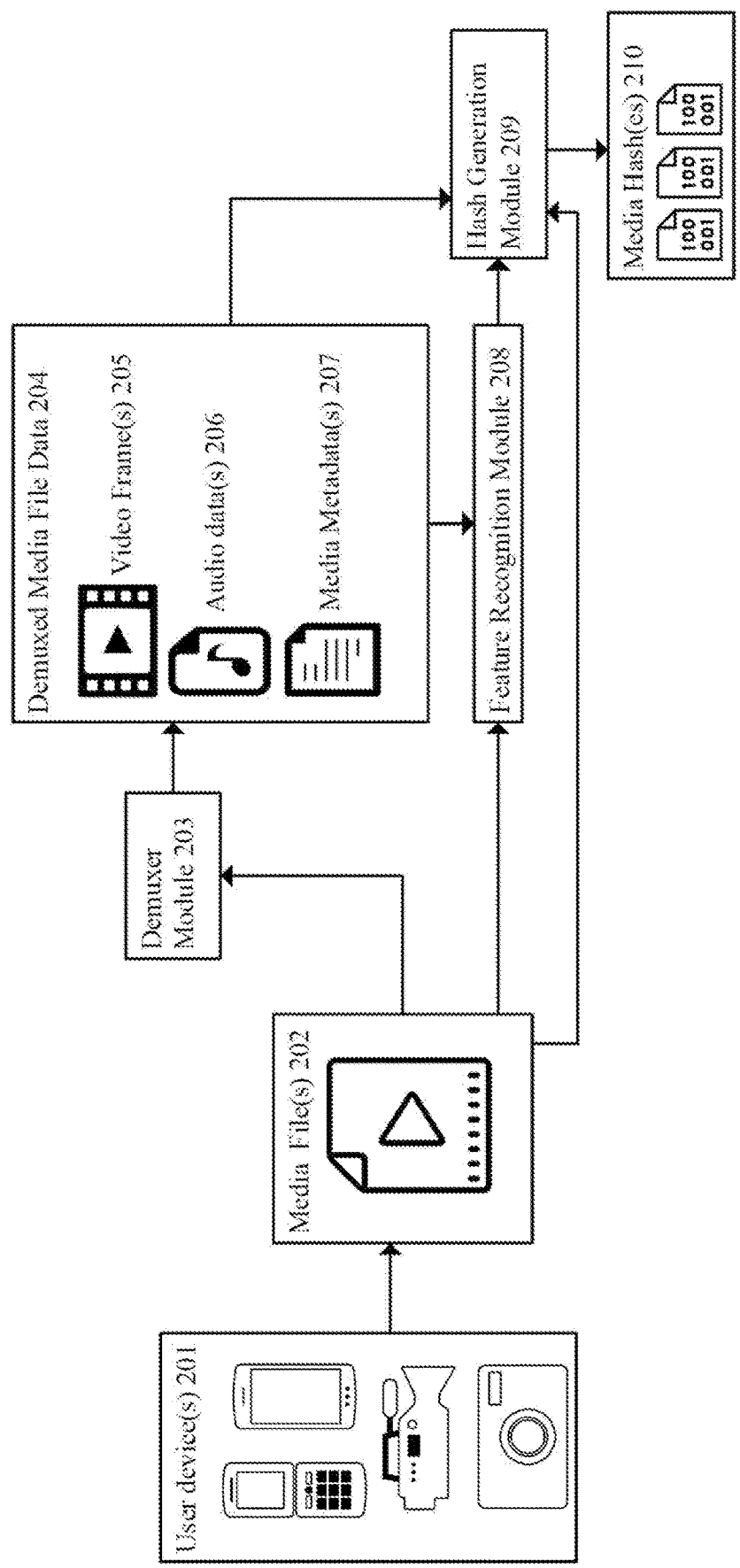
FIG. 2 is a block diagram illustrating a digital distribution ledger-based system for authenticating media content according to an exemplary aspect, with a focus on the hash generation process of this aspect.

FIG. 2 is a block diagram illustrating a digital distribution ledger-based system for authenticating media recordings or media streams according to an exemplary aspect, with a focus on the hash generation process of this aspect. As illustrated by this exemplary aspect, a media recording may be used to generate one or more hashes using a hash generation module included as part of the user device 201 or by a separate media processing module. The hash may be generated directly from the media recording (e.g., by applying a cryptographic algorithm to each frame of a given media, e.g., video and/or associated audio track). Alternatively, the media recording may be separated into individual files 202 or data streams containing some or all of the visual data 205, audio 206 and metadata 207 of the original media recording through a demultiplexing (demuxing) process performed via a demuxer module 203. The resulting files or data streams containing the demuxed data 204 may be used to generate one or more hashes by the hash generation module 209. Optionally, the individual media recording or demuxed data may be subjected to one or more feature recognition algorithms of a feature recognition module 208 prior to the hash generation step in order to identify and/or select one or more features which may be used to generate a hash or hashes associated with the media recording. The resulting hash or hashes may then be archived in a digital distributed ledger as described herein. It is understood that this general process may also be used to generate hashes for media streams, e.g., video streams.

Figure 3:
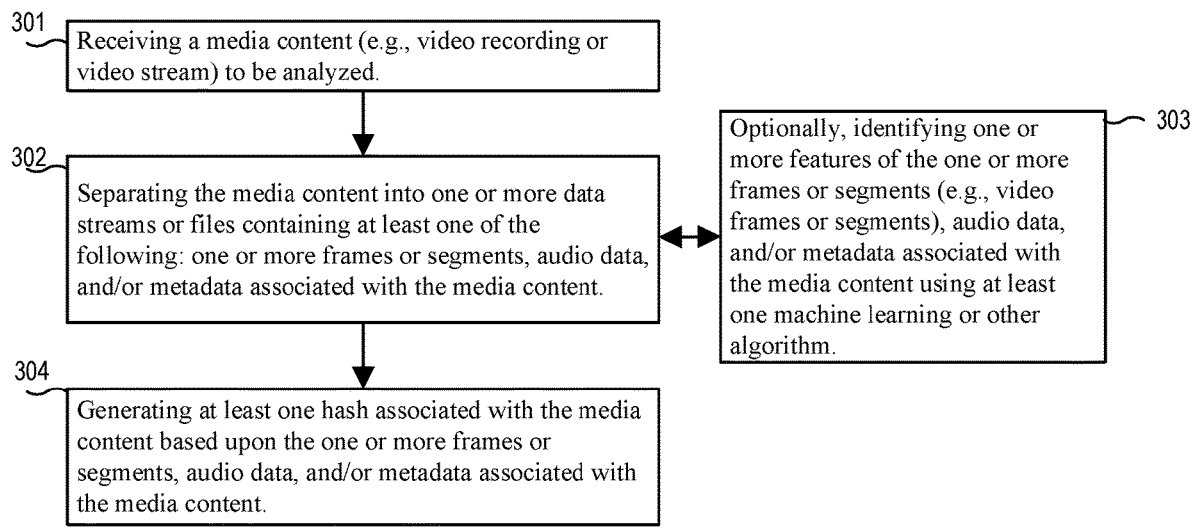
FIG. 3 is a flowchart illustrating a method for authenticating media content according to an exemplary aspect, with a focus on the hash generation process of this aspect.

FIG. 3 is a flowchart illustrating a method for authenticating a media content according to an exemplary aspect, with a focus on the hash generation process of this aspect. In one aspect, the media content being authenticated comprises one or more video recordings, video streams, audio recordings, audio streams, real-time data streams from radars/lidars/spectrals, etc. As illustrated by this figure, a media recording or media stream to be authenticated may be received in step 301, recorded or otherwise generated. In step 302, the media recording or media stream may then be separated into one or more data streams or files containing at least one of the following: one or more frames or segments (e.g., video frames or segments), audio data, and/or metadata associated with the media recording or media stream. Optionally, in step 303, one or more features of the one or more frames or segments, audio data, and/or metadata associated with the media recording or media stream may be identified using at least one machine learning or other algorithm. In step 304, at least one hash associated with the media recording or media stream may be generated based upon the one or more frames or segments, audio data, and/or metadata associated with the media recording or media stream, with or without using the additional data generated by the optional feature recognition step. In one aspect, one or more of the hashes may be fuzzy hashes which may be used to identify similar, if not identical, matches.

Figure 4:
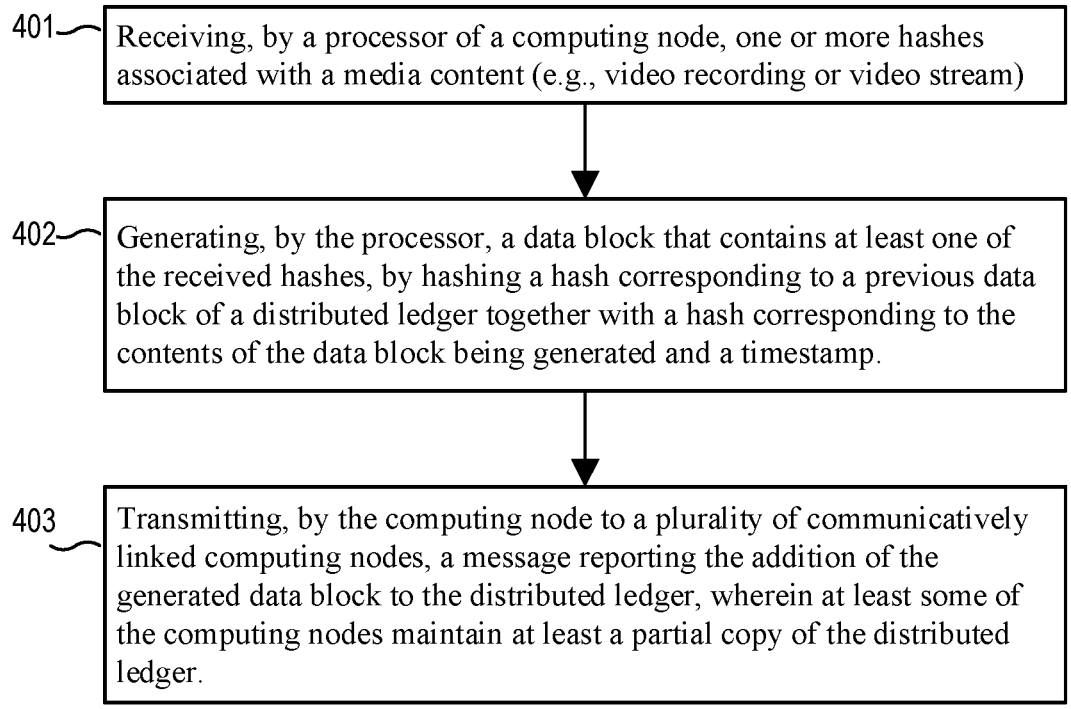
FIG. 4 is a flowchart illustrating a method for authenticating media content according to an exemplary aspect, with a focus on the digital distribution ledger-based storage of a hash according to this aspect.

FIG. 4 is a flowchart illustrating a method for authenticating media content according to an exemplary aspect, with a focus on the immutable records storage, e.g., a blockchain-based storage, of a hash according to this aspect. In one aspect, the media content includes one or more video recordings, video streams, audio recordings, audio streams, or real-time data streams from radars/lidars/spectrals. Once a hash has been generated for a given media recording or media stream, the generated hash may be stored in a distribution ledger, e.g., a blockchain-based distributed ledger. The archiving (storing) process begins in step 401 with the receipt, by a processor of a computing node, of one or more hashes associated with a media recording or media stream. In step 402, a data block is then generated by the processor that contains at least one of the received hashes. The data block is generated by hashing a hash corresponding to a previous data block of the distributed ledger together with the at least one hash, the at least one hash corresponding to the media content of the data block being generated. Thus, as data blocks are sequentially generated, a hash corresponding to the previous data block is hashed with the hash received or computed for the current data block. In one aspect, the hashing process may further include the timestamp. In other words, the data block may be generated by hashing the hash corresponding to the previous data block of the distributed ledger together with the at least one hash, the at least one hash corresponding to the media content of the data block being generated and the timestamp. In other aspects, additional information may be used, such as location data associated with the media content (e.g., GPS coordinates) or information associated with an individual or entity recorded by or participating in the media content being hashed. It is understood that alternative hashing schemes may also be used, as are known in the art and implemented by previous distributed ledgers. In one aspect, the computing node then adds the generated data block to the distributed ledger.

In one aspect, in step 403, the computing node may then broadcast or otherwise transmit to a plurality of communicatively linked computing nodes, a message reporting the addition of the generated data block to the distribution ledger, e.g., the addition of the generated data block to a distributed ledger, wherein at least some of the computing nodes maintain at least a partial copy of the distributed ledger. These additional computing nodes may comprise other data centers, physical or virtual servers or clients able to communicate with the distributed ledger. Some or all of the computing nodes may be operated or controlled by the maintainer of the distributed ledger. In some aspects, some or all of the computing nodes may be controlled by members of the public. As noted above, the distributed nature of the distribution ledger, e.g., the blockchain, makes it difficult for a rogue actor to manipulate the entire distribution ledger. In order to benefit from the teachings, at least two computing nodes should maintain at least a portion of the distributed ledger. The larger the number of computing nodes maintaining the copies in a distributed manner, the larger the advantage of the teaching. Thus, the term "at least some of the computing nodes" is intended to indicate that the number of nodes sharing in the maintenance of the ledger may be based on an application. For example, if the authentication of the content is for an application in which the media content has to be perfectly authenticated, a large number of computing nodes may be needed. In contrast, if an inaccurate decision is not consequential, one may rely on few computing nodes, e.g., three-five computing nodes. The teaching of the present disclosure may be practiced with a blockchain-based distributed ledger or another type of digital distribution ledger that is shared by a small or a large network of computing nodes.

Figure 5:
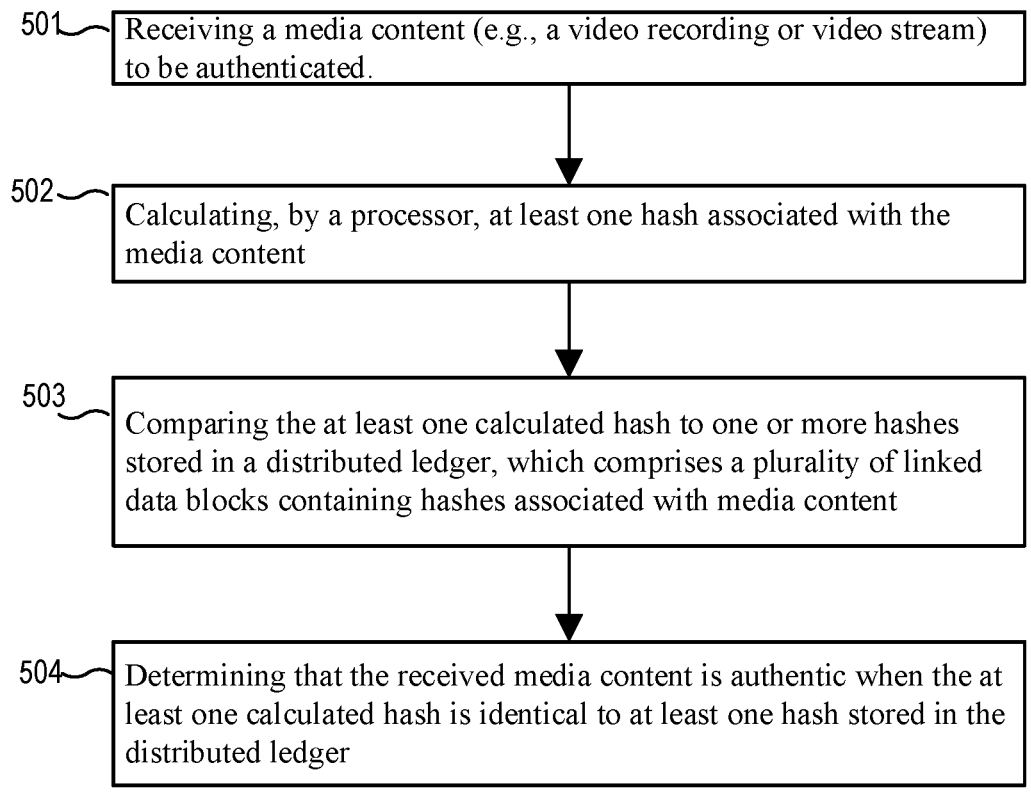
FIG. 5 is a flowchart illustrating a method for authenticating media content according to an exemplary aspect, with a focus on the media content authentication process of this aspect.

FIG. 5 is a flowchart illustrating a method for authenticating media content according to an exemplary aspect, with a focus on the media content authentication process. In one aspect, the media content comprises one or more video recordings, video streams, audio recordings, audio streams, data streams from radars/lidars/spectrals, and the like. When a need arises to authenticate a media recording or media stream, hashes associated with the media recording or media stream may be compared to archived hashes stored in the distribution ledger, e.g., the blockchain-based distributed ledger. The authentication process begins in step 501 with the identification of a media recording or media stream to be authenticated. For example a media content to be authenticated may be uploaded to a website or received by a client capable of accessing hashes stored in a digital ledger, e.g., a blockchain-based digital ledger. In step 502, at least one hash associated with the media recording or media stream to be authenticated may then be calculated. In step 503, the calculated at least one hash is compared to one or more hashes stored in the distribution ledger, which comprises a plurality of linked data blocks containing hashes associated with media recordings and/or media streams. In step 504, the authenticity or integrity of the media recording or media stream may then be determined based upon the results of this comparison. For example in some cases a media content may be deemed to be authentic when the at least one calculated hash is identical to at least one hash stored in the distributed ledger. In some aspects, the received media recording or media stream is determined to be authentic based upon a comparison of a plurality of hashes. For example, a plurality of hashes may be calculated at different points in time within the media recording or media stream to be analyzed, or for different components of the media recording or media stream (e.g., for a video and/or/for the audio track) and then compared against corresponding hashes in the digital ledger, e.g., the blockchain, to improve confidence that the determination is an accurate assessment.

Figure 6:
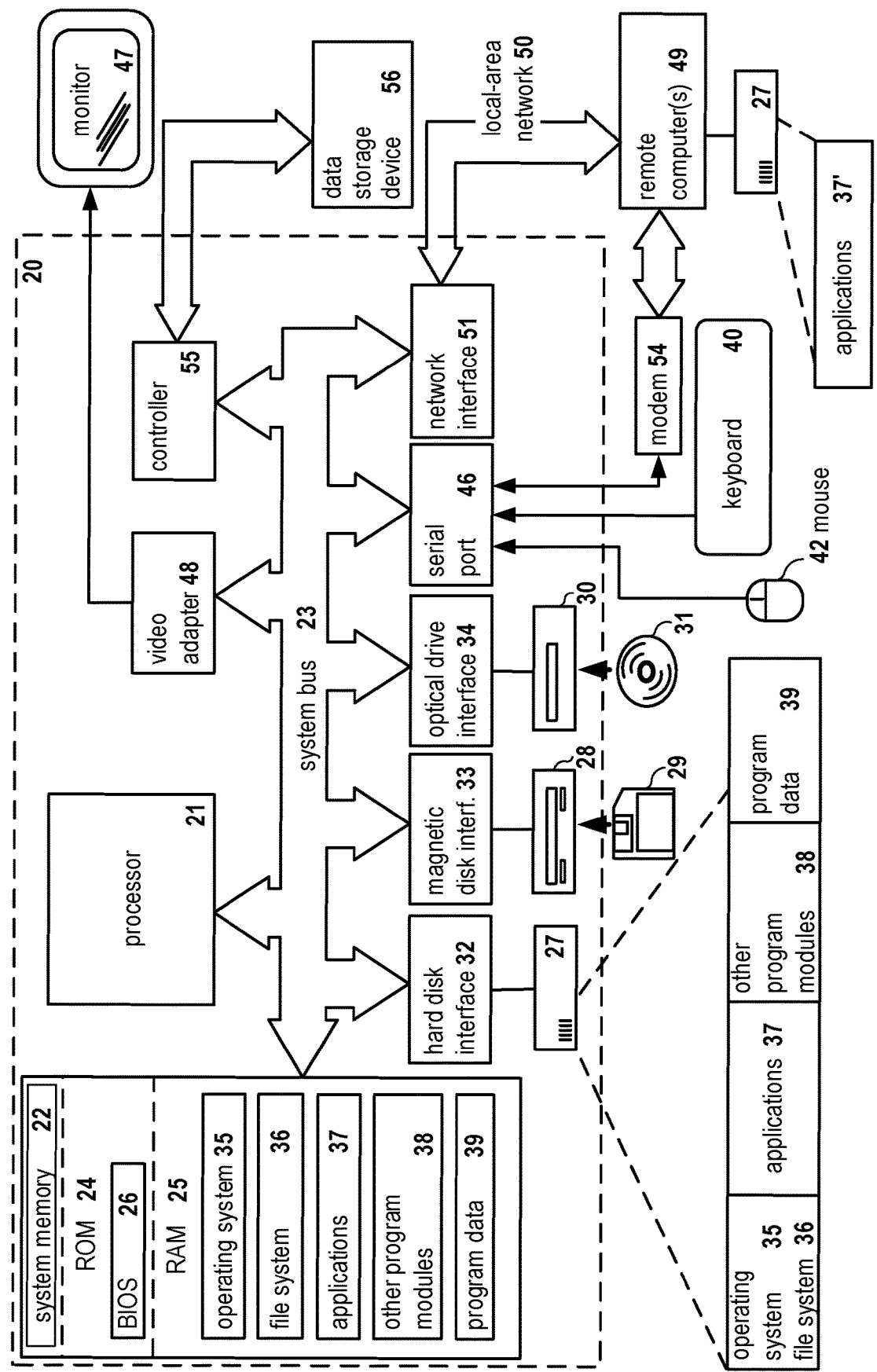
FIG. 6 is a block diagram of a general-purpose computer system on which the disclosed system and method can be implemented according to an exemplary aspect.

FIG. 6 is a block diagram of a general-purpose computer system on which the disclosed systems and methods can be implemented according to an exemplary aspect. It should be noted that the computer system 20 can correspond to the user devices 102 and server system 110, for example, described earlier. As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for storing media authentication data using a distributed ledger, comprising:
   receiving, by a processor of a computing node of a plurality of computing nodes, one or more hashes associated with a media content and a timestamp associated with the media content, the plurality of computing nodes being communicatively linked;
   generating, by the processor, a data block that contains at least one of the received one or more hashes, the data block being generated by hashing a hash corresponding to a previous data block of the distributed ledger together with the at least one hash, the at least one hash corresponding to the media content of the data block being generated; and
   transmitting, by the computing node to the plurality of computing nodes, a message reporting an addition of the generated data block to the distributed ledger, wherein at least some of the plurality of computing nodes maintain at least a partial copy of the distributed ledger.

2. The method of claim 1, wherein the media content is received from any combination of sources of media content and wherein the media content includes at least one: video recording, video stream, audio content, or a data stream from at least one device that analyzes and generates a real time data stream.

3. The method of claim 1, the hashing further including hashing the hash corresponding to the previous data block of the distributed ledger together with the timestamp associated with the media content of the data block being generated.

4. The method of claim 1, wherein a hash of the received one or more hashes associated with the media content is based upon at least one of:
   a) one or more frames of the media content;
   b) audio contained in the media content; and
   c) metadata associated with the media content.

5. A method of claim 4, wherein all the media content is covered with the hash.

6. The method of claim 1, wherein a hash of the received one or more hashes associated with the media content is calculated based upon at least one of:
   a) a segment of the media content;
   b) a plurality of segments of the media content;
   c) a plurality of segments of the media content, wherein the plurality of segments span approximately a full length of the media content;
   d) a plurality of segments of the media content, wherein durations of each of the plurality of segments are approximately a same length; and
   e) a plurality of segments of the media content, wherein gaps between segments of the plurality of segments are approximately a same length.

7. The method of claim 1, wherein a hash of the received one or more hashes associated with the media content is generated by one of:
   a) a computer;
   b) a mobile phone;
   c) a video camera; and
   d) an electronic device.

8. The method of claim 1, wherein a hash of the received one or more hashes associated with the media content is associated with features identified by analyzing the media content using one or more machine learning algorithms, and wherein the computing node that transmitted to the other computing nodes regarding the addition of the generated data block to the distributed ledger is not associated with the generated data block.

9. The method of claim 1, wherein the result of the analysis of the media content provides at least one of: a description of the media content, a media output discernable by humans, or a service information used for performing the analysis.

10. The method of claim 1, further comprising:
    authenticating a second media content using the distributed ledger, the authenticating including: receiving, by the processor, the second media content to be authenticated and a timestamp associated with the second media content;
    calculating, by a processor, at least one hash associated with the received second media content; comparing the at least one calculated hash to one or more hashes stored in the distributed ledger, the distributed ledger comprising a plurality of linked data blocks containing hashes associated with media content; and determining that the received second media content is authentic when a calculated hash of the at least one calculated hash is identical to at least one hash stored in the distributed ledger.

11. The method of claim 1, wherein at least one hash of the received one or more hashes is generated by: receiving a media content to be analyzed and the timestamp associated with the media content; separating the received media content into one or more data streams or files containing at least one of: one or more frames, one or more segments, audio data, and metadata associated with the media content; and generating the at least one hash associated with the media content based upon the data streams or files.

12. The method of claim 11, wherein the generating of the at least one hash further comprises:
transmitting the at least one hash to a computing node that is communicatively linked to a distributed ledger.

13. A system for storing media authentication data using a distributed ledger, comprising:
at least one processor of a computing node of a plurality of computing nodes configured to:
receive one or more hashes associated with a media content and a timestamp associated with the media content, the plurality of computing nodes being communicatively linked;
generate a data block that contains at least one of the received one or more hashes, the data block being generated by hashing a hash corresponding to a previous data block of the distributed ledger together with the at least one hash, the at least one hash corresponding to the media content of the data block being generated; and
transmit a message reporting an addition of the generated data block to the distributed ledger, wherein at least some of the plurality of computing nodes maintain at least a partial copy of the distributed ledger.

14. The system of claim 13, wherein the media content is received from any combination of sources of media content and wherein the media content includes at least one: video recording, video stream, audio content, or a data stream from at least one device that analyzes and generates a real time data stream.

15. The system of claim 13, the hashing further including hashing the hash corresponding to the previous data block of the distributed ledger together with the timestamp associated with the media content of the data block being generated.

16. The system of claim 13, wherein a hash of the received one or more hashes associated with the media content is based upon at least one of:
a) one or more frames of the media content;
b) audio contained in the media content; and
c) metadata associated with the media content.

17. A non-transitory computer readable medium storing thereon computer executable instructions for storing media authentication data using a distributed ledger, including instructions for:
receiving one or more hashes associated with a media content and a timestamp associated with the media content, the plurality of computing nodes being communicatively linked;
generating a data block that contains at least one of the received one or more hashes, the data block being generated by hashing a hash corresponding to a previous data block of the distributed ledger together with the at least one hash, the at least one hash corresponding to the media content of the data block being generated; and
transmitting a message reporting an addition of the generated data block to the distributed ledger, wherein at least some of the plurality of computing nodes maintain at least a partial copy of the distributed ledger.

18. The non-transitory computer readable medium of claim 17, wherein the media content is received from any combination of sources of media content and wherein the media content includes at least one: video recording, video stream, audio content, or a data stream from at least one device that analyzes and generates a real time data stream.

19. The non-transitory computer readable medium of claim 17, the hashing further including hashing the hash corresponding to the previous data block of the distributed ledger together with the timestamp associated with the media content of the data block being generated.

20. The non-transitory computer readable medium of claim 17, wherein a hash of the received one or more hashes associated with the media content is based upon at least one of:
a) one or more frames of the media content;
b) audio contained in the media content; and
c) metadata associated with the media content.

* * * * *